A. H. WHEAT.
GRAIN SPROUTER.
APPLICATION FILED APR. 18, 1911.
1,013,831.
Patented Jan. 2, 1912.
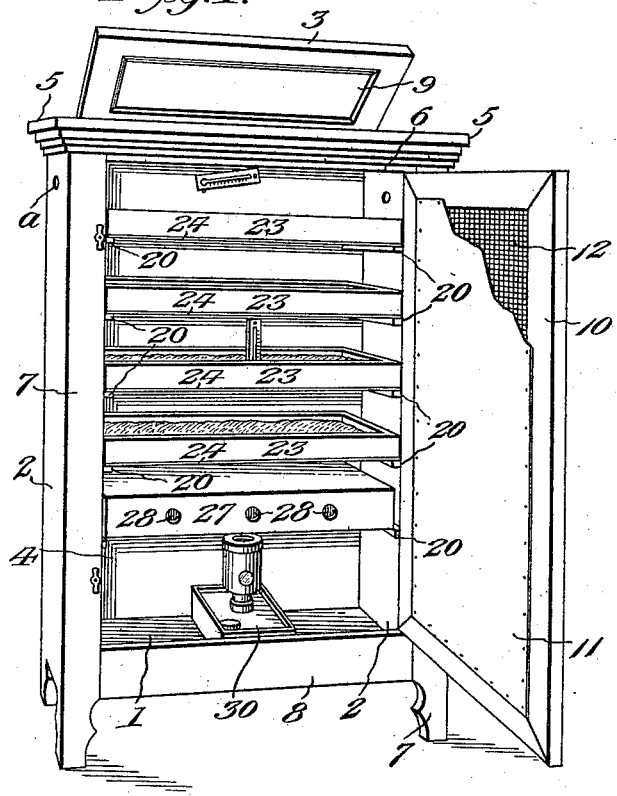
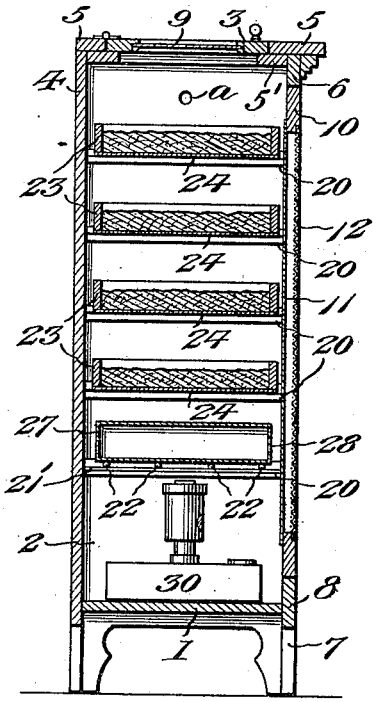
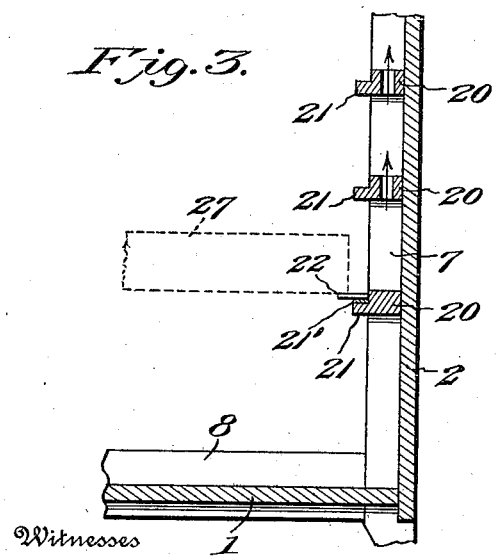
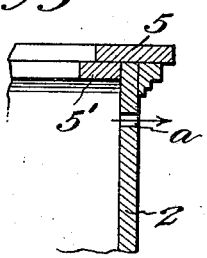
Witnesses
Edwin L. McKee
A. B. Barnham
Inventor
Alfred H. Wheat
By Geo. W. Sults
Attorney

UNITED STATES PATENT OFFICE.

ALFRED H. WHEAT, OF HORSEHEADS, NEW YORK.

GRAIN-SPROUTER.

1,013,831.     Specification of Letters Patent.     Patented Jan. 2, 1912.

Application filed April 18, 1911. Serial No. 621,743.

*To all whom it may concern:*

Be it known that I, ALFRED H. WHEAT, a citizen of the United States, and a resident of Horseheads, in the county of Chemung and State of New York, have invented certain new and useful Improvements in Grain-Sprouters, of which the following is a specification, reference being had to the accompanying drawings.

This invention has relation to certain new and useful improvements in grain sprouters.

The primary object of my invention is to provide a light, simply constructed, inexpensive cabinet, serving as a "hot house" in which to sprout certain grains and seeds, to be used as green food for chicks and fowls.

A further object is to provide a ventilated heating chamber, including a safety heating lamp, hot air chamber, a series of superposed trays and a top lid serving as a valve.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification, and in which like numerals of reference indicate similar parts in the several views: Figure 1, is a perspective view of a grain sprouter embodying my invention. Fig. 2, is a vertical sectional view, and Figs. 3 and 4, show certain details of construction.

In poultry culture it is found that chicks prosper and hens lay more fertile eggs, when they are fed green food during the winter months or in case of drouths in summer. In this connection it has been discovered that certain seeds and grains moistened and placed in a gently heated chamber, will sprout, providing a green wholesome food greatly relished by the birds.

In my present invention I provide a cheap, conveniently arranged cabinet in which certain grains can be sprouted in four to five days, fit for feeding purposes, the seed forming a solid mass of crisp rootlets with tender green top growths or stalks.

In carrying out the aim of my invention I employ a bottom 1, to which I secure the two similar ends 2, and the back 4. The front includes two similar front battens 7, a top skirt 6, and a bottom skirt 8. Secured to the upper ends of the members 2, the back 4, and the skirt 6, is a flat frame, comprising four battens 5'. This frame serves to receive a horizontally disposed valve-forming top door frame 3, carrying the glass plate 9, as clearly shown in Fig. 1. Held to the frame 5', is an auxiliary top frame 5. The door frame 3, is secured to the top frame 5, by means of suitable hinges. Secured in horizontal parallel spaced relation to the sides 2, are a plurality of cleats 20, each cleat having a projecting ledge 21. These ledges project beyond the front battens 7, as disclosed. Removably held upon the projecting ledges 21, are a series of trays, each tray comprising a four sided frame 23, to which is secured a metal bottom 24, having one or more drain openings. The lowermost cleat 20, is provided with an asbestos strip 21', and held within the two lowermost cleats and resting upon the asbestos strip 21', are four horizontally disposed outstanding pins 22. Resting upon these pins is a sheet metal hot air chamber 27, having the vent openings 28.

Held within the cabinet below the hot air chamber 27, is a safety lamp 30, of any approved construction.

The front of the cabinet is closed by means of a door frame 10, vertically connected to one of the front battens 7, this door frame being covered by means of a fabric 11. As shown, the outside is protected by means of a wire netting 12. The sides 2, as well as the cleats 20, are provided with suitable vent openings. At a suitable point within the cabinet, I have placed one or more thermometers.

The operation of my invention is very simple. The grain to be sprouted is placed within the trays and moistened. The lamp is then started so that the moistened grain or seed is subjected to a gentle heat. The heat after circulating about the trays finally escapes out of the upper vent openings *a*. As soon as the grain has sprouted to a suitable height the entire mass is removed and used as a green feed. Ventilation is also had by means of the top door.

In Fig. 1, a cabinet is shown holding four trays. In such a cabinet one tray could be filled each day and set one division upward every twenty-four hours, so that one tray of sprouted grain may be removed each day to be replaced by a new tray filled with moistened grain.

It is of course understood, that these cabinets are made in various sizes. The use of a fabric door is very important as it permits fresh air entering the cabinet, thereby preventing the grain turning musty or moldy during the germinating process.

The cabinet is simple and inexpensive in construction and both durable and efficient in operation.

Having thus described my said invention, what I claim as new and desire to secure by United States Letters Patent is:

A cabinet of the character described, embracing a connected bottom, ends, and back, two similar front battens secured to said bottom and ends, a top skirt connecting said two battens at their upper ends, a four sided flat frame secured to said battens, skirt, ends, and back, a horizontally disposed top door frame hinged to said flat frame, a glass plate being inserted within said top door frame, a vertically disposed door frame hinged to one of said front battens, a fabric covering said door frame, a plurality of superposed cleats secured to said ends, each having a tray supporting ledge projecting beyond said front batten said cleats and ends having vent openings, trays removably held upon said ledges, a strip of asbestos upon the two opposite lowermost ledges, pins horizontally extending from said lowermost ledges and resting upon said strips, an apertured metallic hot air chamber removably held below said trays and upon said pins, and a safety lamp located below said chamber, all arranged substantially as and for the purpose set forth.

In testimony whereof I affix my signature, in presence of two witnesses.

ALFRED H. WHEAT.

Witnesses:
HARRY J. ELWOOD,
C. M. BOTSFORD.

---

Copies of this patent may be obtained for five cents each, by addressing the "Commissioner of Patents, Washington, D. C."